(12) United States Patent
Baker et al.

(10) Patent No.: US 6,357,296 B1
(45) Date of Patent: Mar. 19, 2002

(54) VIBRATORY SENSOR WITH VIRTUAL NODE/ANTINODE CORRECTION OF SECONDARY HARMONICS

(75) Inventors: John C. Baker, Santa Barbara; Daniel T. Zaida; Gregory M. Johnson, both of Goleta, all of CA (US)

(73) Assignee: Litton Systems, Inc., Woodland Hills, CA (US)

( * ) Notice: Subject to any disclaimer, the term of this patent is extended or adjusted under 35 U.S.C. 154(b) by 0 days.

(21) Appl. No.: 09/434,983

(22) Filed: Nov. 5, 1999

(51) Int. Cl.[7] ................................. G01P 9/04
(52) U.S. Cl. ................................. 73/504.13
(58) Field of Search ................... 73/504.13, 504.12, 73/504.04

(56) References Cited

U.S. PATENT DOCUMENTS

| | | | | |
|---|---|---|---|---|
| 5,383,362 A | * | 1/1995 | Putty et al. | 73/504.01 |
| 5,616,864 A | * | 4/1997 | Johnson et al. | 73/504.13 |
| 5,712,427 A | * | 1/1998 | Matthews | 73/504.13 |

* cited by examiner

Primary Examiner—John E. Chapman
(74) Attorney, Agent, or Firm—Price and Gess

(57) ABSTRACT

A vibratory sensor with a resonator for measuring angular rotation, such as for example a hemispherical resonator gyroscope (HRG) operating in force rebalance mode, includes circuitry to generate a virtual node and antinode in the resonator standing wave. Shifting a pair of pickoff electrodes from a position directly over an actual node in the HRG standing wave to an offset position where the primary and secondary harmonic contributions at the first pickoff electrode are equal to the primary and secondary harmonic contributions at the second pickoff electrode permits the elimination of secondary harmonics contribution. A virtual node is created by offsetting a pair of pickoff electrodes 22.5 degrees from the actual antinode such that each pickoff electrode includes an equal contribution of the secondary harmonic signal present in the standing wave. Differencing the two signals eliminates both the primary signal contribution as well as the secondary harmonic signal contribution, thereby reducing the signal below the actual node signal. The virtual node can then be amplified to a greater extent without the filtering and shifting that is ordinarily required of the signal processing at the actual node. While the virtual antinode includes contributions of the secondary harmonic signal at both pickoff electrodes, the peak amplitude of the secondary harmonic is typically only one percent of the primary vibration pattern and does not adversely affect the processing of the virtual antinode. Using a circuit which adds and differences the two inputs requires only two additional buffers and results in a vibratory sensor with significantly better accuracy.

20 Claims, 3 Drawing Sheets

US 6,357,296 B1

VIBRATORY SENSOR WITH VIRTUAL NODE/ANTINODE CORRECTION OF SECONDARY HARMONICS

BACKGROUND OF THE INVENTION

1. Field of the Invention

The present invention relates to the field of vibratory rotation sensors such as, for example, hemispherical resonator gyroscopes ("HRG"s), and more particularly to a vibratory sensor where unwanted secondary harmonics are eliminated using a virtual node/antinode.

2. Description of Related Art

Vibratory sensors employ a resonating member to pick up rotation of the sensor based on the effect of Coriolis force on the resonating member. One type of vibratory sensor, used herein for example purposes only, is referred to as a hemispherical resonator gyroscope. It is to be understood that while the present discussion uses the HRG to illustrate the benefits and operation of the present invention, the present invention's application extends to any vibratory sensor which measures oscillations of a resonating member.

Hemispherical resonator gyroscopes are known in the art for measuring an angular rate of a body about a predetermined axis. HRGs are of critical importance in space applications, such as the orienting of satellites and space vehicles. HRGs are reliable and have a long active life, making the gyro especially suited for this purpose. The gyros are typically comprised of a forcer electrode assembly, a hemispherical thin-walled quartz shell, and a pick-off electrode assembly joined together with a rare-earth metal such as indium. The unit is housed in a vacuum chamber with electrical feeds to communicate voltage signals from the gyro to a microprocessor for interpretation. The general operation of the gyroscope is discussed in the Letters Patent to Loper, Jr. et al., U.S. Pat. No. 4,951,508, which is fully incorporated herein by reference.

The hemispherical resonator 10 is a bell-shaped thin walled structure with a rim that can be made to deform from a circular profile to an elliptical profile when subjected to certain external electrical fields. The resonator is supported by an integral stem which itself is supported by the housing for the pick-off and forcer electrodes. By applying a cyclical forcing voltage, a standing wave pattern can be established in the resonator. To establish the standing wave, the hemispherical resonator is initially biased at a voltage of known magnitude, and then a varying electrical field is applied at the forcer electrodes. If the forcer electrodes apply the appropriate varying electrical field at angular intervals of 90 degrees, the resonator will flexure in a standing wave such as that shown in FIG. 1.

The primary harmonic resonating wave has four nodes a,b,c,d and four antinodes e,f,g,h around the perimeter of the resonator, alternating and equal spaced forty-five degrees apart. Nodes are points on the standing wave where displacement is a minimum, and antinodes are points on the standing wave where displacement is a maximum. Operation of the HRG requires precise tracking of the standing wave movement, which in turn requires that the location of the nodes and antinodes be accurately determined.

It is a physical property of the gyroscope that if an unrestrained resonator is rotated about an axis normal to the page (see FIG. 2), the standing wave will precess in an opposite direction to the original rotation due to Coriolis force. Moreover, the amount of the angular precess will be 0.3 times the angular displacement of the resonator, where 0.3 is a geometric property of the resonator's hemispherical shape and holds constant for any rotation angle and any rotation rate. For example, if the resonator of FIG. 1 is rotated ninety degrees in the counter-clockwise direction, as indicated by the angular displacement of the notch 20, the standing wave will precess twenty-seven degrees clockwise as shown in FIG. 2. In this manner when an HRG is rotated about its primary axis, by measuring the change in the angular position of the standing wave information about the rotation of the HRG can be determined.

The position of the standing wave both before and after the rotation of the gyroscope is determined by the pick-off electrodes positioned about the external annular component of the housing. By measuring the capacitance across the gap formed between the pick-off electrodes and the resonator, the distance across the gap can be accurately determined. This information is processed by a microprocessor in a manner such that the exact position of the standing wave is determined. By measuring the change in position of the standing wave, the rotation of the gyro can readily be determined.

HRGs operate in one of two modes—whole angle mode and force rebalance mode. In whole angle mode, the standing wave is allowed to precess unhindered under the influence of the Coriolis force caused by the rotation of the gyro as just described. The instantaneous position of the standing wave is evaluated by computing the arctangent of the ratio of the amplitude of the two pickoff signals. In the whole angle mode the gyro's dynamic range is limited solely by the resolution and processing of the pick-off signal estimation.

In the force rebalance mode, the standing wave is constrained such that it does not precess under the influence of the Coriolis force, and the magnitude of the restraining force is used to calculate the rotation rate of the gyro. In this mode, an additional forcing signal is included which holds the standing wave at a fixed azimuthal location. The amount of force necessary to maintain the standing wave fixed is proportional to the input rotational rate. For force rebalance gyros, the case-oriented control and readout processing is eliminated, and the output noise performance can be optimized because the dynamic range requirements of the pick-off signal estimation are greatly reduced.

In the force rebalance mode, four separate control mechanisms are necessary. The first control mechanism is the phase-lock loop, which is necessary to track the natural frequency and phase of the high Q resonance. This loop provides a timing reference for the other readout and drive mechanisms. The second control mechanism is the amplitude control loop, which establishes and maintains the required stable standing wave amplitude. The third control mechanism is the quadrature control loop, which is used to eliminate the small frequency mismatch between the two principal axes of flexure. The final control mechanism is the rate control loop, which is attributed only to the force rebalance mode, and holds the standing wave in a fixed position while measuring the inertial rate directly through the applied closed-loop forcing.

The phase-lock, amplitude control, and quadrature loops are required for both whole angle mode and force rebalance mode. The amplitude control and the phase-lock loops maintain the flexing amplitude and timing reference, respectively. These processes are associated with the antinode axis pickoffs and forcers. The nominal flexing amplitude defines the stored momentum and the rate scale factor in the HRG in the force rebalance mode. The phase-locked loop is necessary to track the free-running oscillation of the resonator so that the demodulation and drive functions can be synchronized to the narrowband resonance. The quadrature and rate control loops use independent forcers to drive the nodal pickoff amplitude components to zero. The quadrature control loop suppresses the quadrature-mode vibration which develops because of the small frequency mismatch between the two axes.

The rate control loop uses the rate drive to null the in-phase nodal amplitude component, i.e., standing wave deflection. FIG. 3 is a representation of a rate control loop, where the box 30 represents a model of the HRG mechanics. The model includes a scale factor K which converts volts to an electrostatic force that cancels the Coriolis force due to an inertial input, and the resultant difference force to dynamic response P(s) of the in-phase nodal amplitude $y_i$. The difference force includes a thermal noise component $\Omega_{TN}$ as well as a bias component $\Omega_B$. The input from the HRG pickoff is amplified 40 and converted to a digital signal 50 where a microprocessor 60 can analyze the signal and output a rate estimate R. The digital rate estimate is supplied to the digital to analog converter which generates a HRG phase synchronous signal of the necessary amplitude to maintain $Y_i$ at zero. The analog signal is amplified 80 and summed with the forcer electrode voltage signal $V_{DN}$ and the signal is returned to the model 30 for further processing.

In the force rebalance mode, the primary vibration wave or patter, i.e., the 2N vibration pattern, is constrained to be fixed with respect to the HRG. The present HRG constrains the standing wave such that a node is fixed directly under a pickoff electrode. Since the signal is reduced to a theoretical minimum directly under the node, the signal can be amplified for greater precision. It is this amplified signal $V_{PN}$ which is the input to the rate control loop, and is used to control the forcing command to maintain this signal at "zero."

The shortcoming with the methodology just described is that the standing wave in the resonator has harmonics in addition to the 2N vibration pattern. Of these, the secondary harmonic is the most important, because the secondary harmonic has a maximum located at the 2N vibration pattern node. Thus, where the signal is ideally supposed to be zero there is a maximum contribution from the secondary harmonic, which limits the amplification of the signal. In addition, the pickoff capacitor has a finite size, and experiences the displacement of the resonator directly under the entire surface of the electrode. Because of the spherical geometry of the pick-off and the shape that the resonator takes when it flexes, when the node is directly in the center of the pickoff there is an average displacement between the flexing resonator and the pickoff at twice the primary frequency. This second harmonic prevents a high amplification of the signal.

OBJECTS AND SUMMARY OF THE INVENTION

The present invention seeks to overcome the shortcomings of the prior art vibratory sensors by creating a virtual node and antinode to evaluate the standing wave inertial signal. In a preferred embodiment of the present invention, a virtual node is created by constraining the actual antinode of the 2N vibration pattern equally spaced between two pickoff electrodes. The signals from these two pickoff electrodes are then both summed and differenced by appropriate electronic circuitry to create a virtual antinode and a virtual node, respectively. The virtual node is created because the two signals equally spaced from the actual antinode both include an equal contribution from the 2N flexing mode and the secondary harmonic, such that when the two signals are differenced the resultant signal has a very small output. Similarly, the virtual antinode comprises the peak radial displacement of the 2N flexing mode and the secondary harmonic flexing mode. The virtual node is now reduced to the level of electrode manufacturing differences, which is small enough to permit high amplification without the need for frequency shifting and filtering. While the virtual antinode includes two contributions from the secondary harmonic, the value of the secondary harmonic is less than one percent (1%) on average of the primary vibration mode and hence the contribution of the secondary harmonic will not significantly impact the dynamic range of the analog-to-digital conversion when sampling the virtual antinode.

BRIEF DESCRIPTION OF THE DRAWINGS

The exact nature of this invention, as well as its objects and advantages, will become readily apparent upon reference to the following detailed description when considered in conjunction with the accompanying drawings, in which like reference numerals designate like parts throughout the figures thereof, and wherein.

DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide a mechanism for generating a virtual node and a virtual antinode on a vibratory sensor that can be evaluated at higher amplification than the actual node and antinode by eliminating unwanted secondary harmonics.

Figure 1:
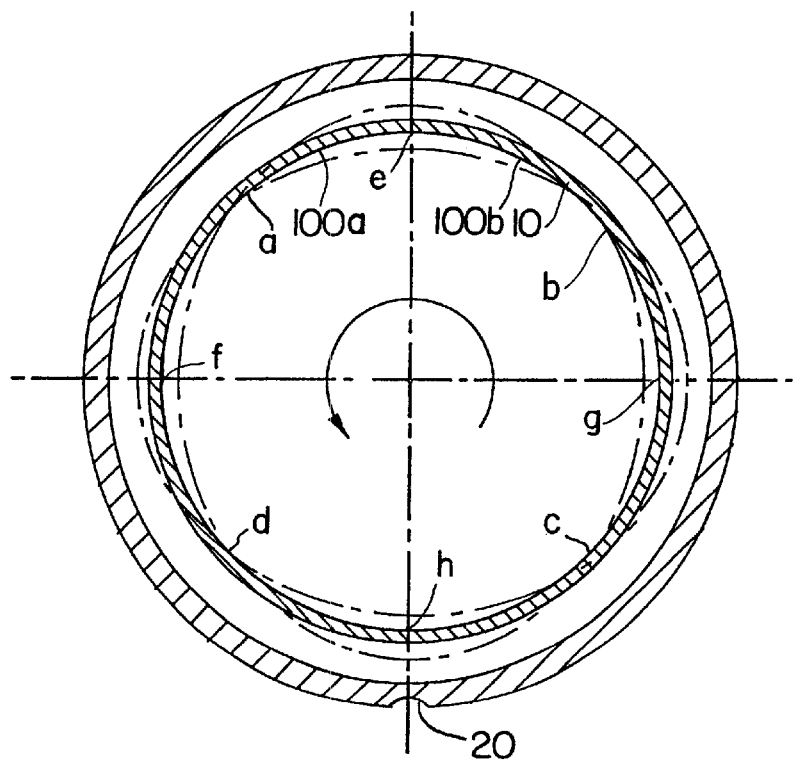
FIG. 1 is a diagram of a standing wave of the type generated by a vibratory sensor.
Figure 2:
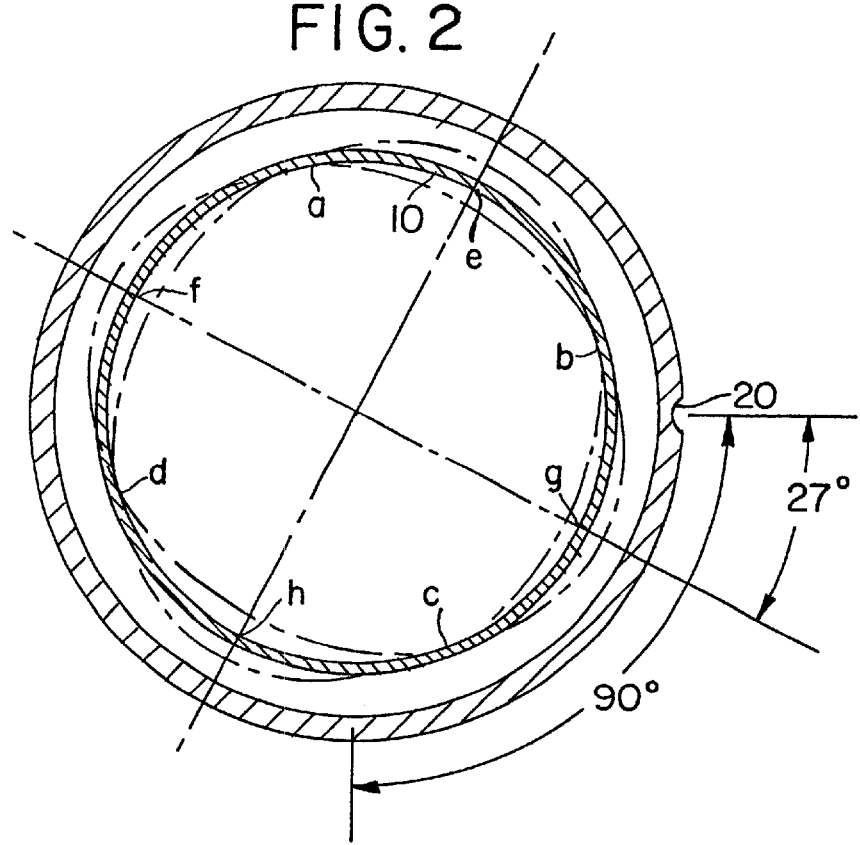
FIG. 2 is a diagram of the standing wave of FIG. 1 after the vibratory sensor has been rotated about an axis normal to the page by ninety degrees.
Figure 3:
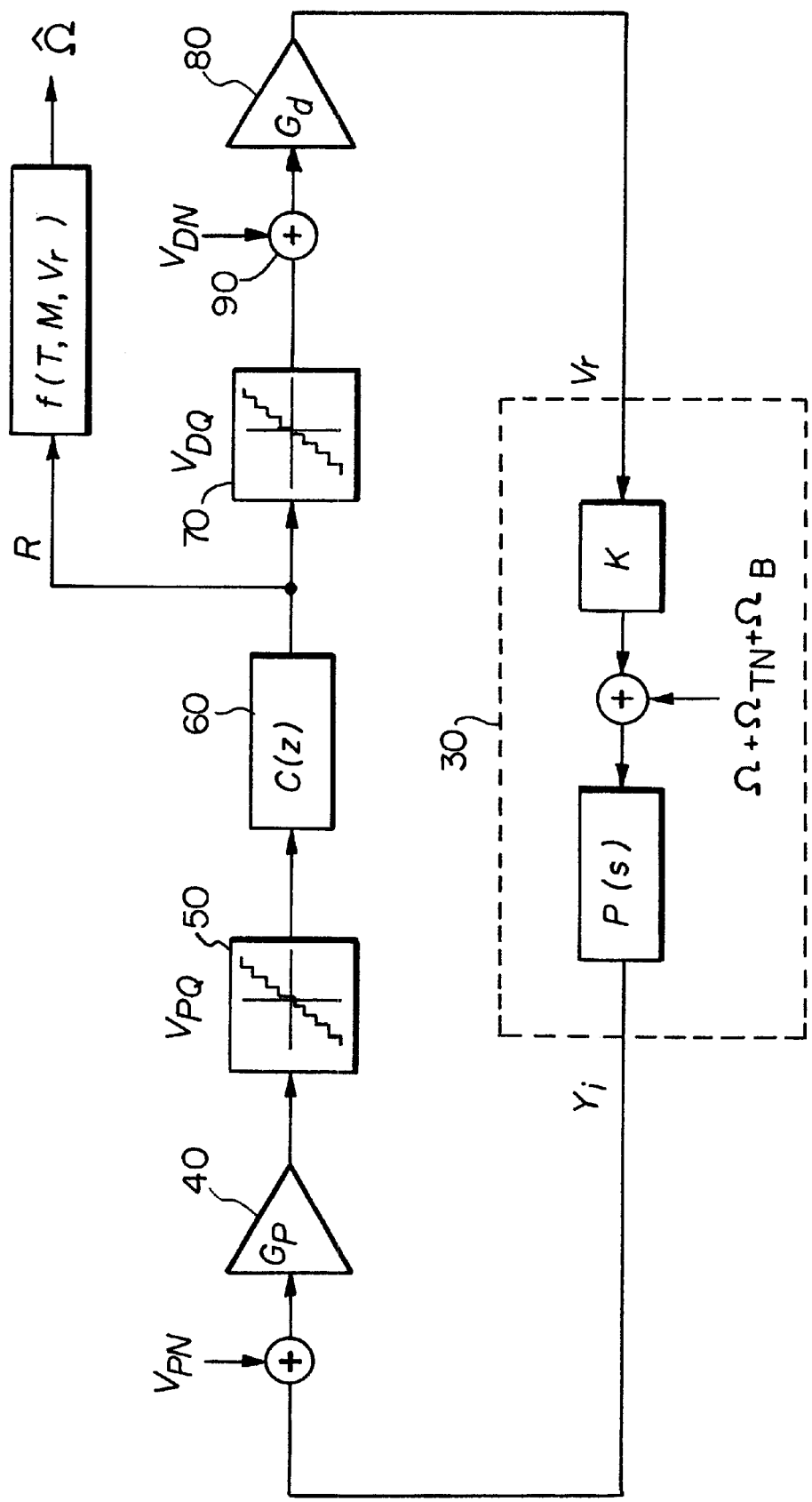
FIG. 3 is a schematic diagram of a rate control loop for a vibratory sensor.

Although the present description uses a hemispherical resonator gyroscope to illustrate the operation of the present invention, it is to be understood that the present invention is applicable to other vibratory sensors where rotation rate is measured using Coriolis force. FIG. 1 depicts a standing wave of an HRG, where dashed lines represent maximum and minimum deflections of the standing wave. In a preferred embodiment of the present invention, a first pickoff electrode 100a is located at a position spaced twenty-two and one half degrees from the antinode e, and a second pickoff electrode 100b is located on the other side of the antinode e an equal distance from the first pickoff electrode. Operating in force rebalance mode, the resonator will be maintained in this pattern by the electronics of the system. In this position, both pickoff electrodes will experience a signal which is neither a minimum nor a maximum of the primary 2N signal, but rather both pickoff electrodes receive a signal which is approximately seventy percent of the peak of the primary signal. The location of the pickoff electrodes provides a signal with a contribution from both the 2N vibration pattern (i.e., the primary vibration mode) as well as the secondary harmonic pattern of the standing wave.

At 22.5 degrees from the antinode location, the signal is given by the expression:

$$A \cos(45+\theta_{error}) \times \sin(\omega t) + B \sin(45+\theta_{error}) \times \sin(2\omega t)$$

where A is the peak amplitude of the 2N signal, $\theta_{error}$ is offset between the predicted position and the actual position of the standing wave, and B is the peak amplitude of the secondary harmonic signal. The expression for the second pickoff electrode is $$A \sin(45+\theta_{error}) \times \sin(\omega t) + B \cos(45+\theta_{error}) \times \sin(2\omega t)$$

where the coefficients have the same meaning as before.

If the signals from the two pickoff electrodes are differenced, the expression for the resultant signal is given by, after a small angle approximation, $$\theta_{error}(A\sqrt{2}\sin(\omega t) - B\sqrt{2}\sin(2\omega t)).$$

This signal is amplified and digitally sampled. A microprocessor then performs a numerical demodulation on the amplified signal that distinguishes between the 2N signal ($\sin \omega t$) and the secondary harmonic signal (($\sin 2\omega t$)). The microprocessor then commands the forcing electrodes to minimize the amplitude of the 2N component of the amplified signal, which ideally drives $\theta_{error}$ to zero. There is an error associated with the variation of the electrodes which may be as much as two percent (2%). Thus, when there is a null in the 2N signal at the difference of the two electrodes, the value of the secondary harmonic may be as large as two one hundredths of a percent times the peak amplitude of the 2N signal. This permits an amplification of 1/0.0002=5000 before the secondary harmonic signal would saturate the analog-to-digital converter, and an eleven bit (2048) or a twelve bit (4096) amplifier is used for this purpose.

Figure 4:
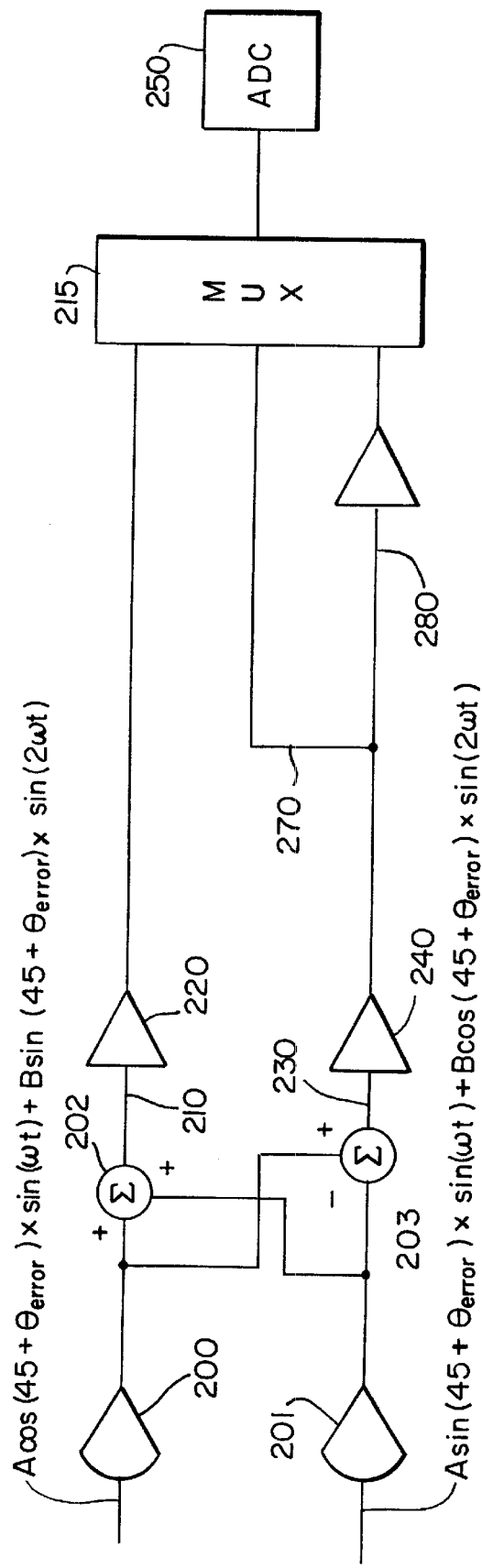
FIG. 4 is a schematic diagram of a preferred embodiment inertial data processing circuit of the present invention.

FIG. 4 shows a schematic for a circuit to accomplish the objectives of the present invention. Buffer 200 receives the signal from the first pickoff electrode and buffer 201 receives the signal from the second pickoff electrode. A virtual antinode is created by a summing element 202 which adds the two signals, and a virtual node is created by a differencing element 203 that subtracts buffer 200 from buffer 201. The signal 210 at the virtual antinode is amplified by amplifier 220 and communicated to the multiplexor 215 connected to the analog-to-digital converter 250. The signal 230 at the virtual node is amplified by amplifier 240 and separated into two signals 270,280, the first signal 270 is communicated to the multiplexor 215 unamplified and the second signal 280 is highly amplified before being received by the multiplexor 215. The splitting of the virtual node signal is beneficial for startup purposes and to permit a low whole angle mode of operation.

Whereas before the processing of the signals required additional analog circuits to demodulate the signal and filter the result, the present invention improves the accuracy without the additional circuits and filters at a cost of only two additional sum and difference amplifiers. Moreover, the aliases associated with the square wave demodulation of the odd harmonics, which are interpreted as inertial bearing signal information, are eliminated by the present invention.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. An inertial input processing circuit for a vibratory sensor with a constrained resonator comprising:

a first pickoff electrode for detecting a radial displacement of a standing wave, said first pickoff electrode positioned to detect a time-varying radial displacement of said standing wave midway between an antinode position and a first adjacent node position and generate a first voltage signal characteristic of the time varying radial displacement, and a second pickoff electrode positioned to detect a time-varying radial displacement of the standing wave midway between the antinode position and a second adjacent node position and generate a second voltage signal characteristic of the time varying radial displacement;

a signal summing element connected to said first and second pickoff electrodes, said signal summing element generating a summed signal by adding the first voltage signal to the second voltage signal;

a signal differencing element connected to said first and second pickoff electrodes, said signal differencing element generating a differenced signal by subtracting the second voltage signal from the first voltage signal, such that a contribution from a secondary harmonic pattern present in said first and second voltage signal is eliminated in the differenced signal;

an amplifier connected to said signal differencing element for receiving the differenced voltage signal and generating an amplified differenced signal; and a multiplexor connected to the signal summing element and the signal differencing element for receiving the summed voltage signal, the differenced voltage signal, and the amplified differenced voltage signal.

2. A method for eliminating the contribution of a secondary harmonic vibration from the detection of a location of a standing wave in a vibratory sensor comprising the steps of:

locating a first pickoff electrode twenty-two and one half degrees from a location of an antinode node defined by a primary vibration pattern, and locating a second pickoff electrode twenty-two and one half degrees in the opposite direction from the location of the antinode;

communicating a voltage signal from said first pickoff electrode to a first buffer, and communicating a second voltage signal from said second pickoff electrode to a second buffer;

creating a virtual antinode by summing the voltage signals from said first buffer and said second buffer, and directing the summed voltage signal to a multiplexor;

creating a virtual node by differencing the voltage signals from said first buffer and said second buffer, and directing the differenced voltage signal to the multiplexor;

directing the differenced voltage signal to an amplifier for amplification of said differenced voltage signal, and communicating said amplified differenced voltage signal to the multiplexor;

communicating the summed voltage signal and the amplified differenced voltage signal to an analog-to-digital converter for converting the voltage signals to a digital signal; and communicating the digital signals to a microprocessor for demodulating the digital signals and commanding an output forcing signal based on an evaluation of the demodulated digital signals.

3. An improved hemispherical resonator gyroscope operating in force rebalance mode of the type comprising a forcing electrode assembly, a hemispherical resonator adapted to oscillate in a standing wave pattern in the presence of an external electrical field generated by said forcing electrode assembly, and a pickoff electrode assembly for detecting a position of said standing wave by measuring a capacitance between individual pickoff electrodes and said hemispherical resonator and converting the displacement to a voltage signal, and where said standing wave pattern comprises a primary vibration pattern and at least one secondary harmonic vibration pattern, said improvement comprising:

a pair of individual pickoff electrodes located about a periphery of the standing wave with each of said individual pickoff electrodes lying equal distance and on opposite sides of an antinode on the primary vibration pattern of the standing wave, such that the contribution of the voltage signal from the primary vibration pattern and the contribution of the secondary harmonic vibration pattern is equal to corresponding primary and secondary harmonic vibration pattern contributions for each pickoff electrode;

a virtual node generated by differencing the voltage signal at one pickoff electrode from the voltage signal at the other pickoff electrode such that the voltage signal at the virtual node does not have a contribution from either the primary vibration pattern or the secondary harmonic vibration pattern; and an amplifier chosen to maximize the signal at the virtual node without filtering or frequency shifting.

4. A method for correcting a phase determination of an oscillating signal having a known amplitude and frequency comprising the steps of:

predicting the phase of the oscillating signal constraining an actual antinode of said oscillating signal between a first and second electrode such that said electrodes receive a signal having equal first vibration mode contributions and equal second vibration mode contributions;

generating a virtual antinode by summing the signals from said first and second electrodes such that an overall contribution of said second vibration mode is negligent compared to a contribution of said first vibration mode;

generating a virtual node by differencing the signals from said first and second electrodes such that the resultant signal comprises neither a contribution from said first vibration mode nor a contribution from said second vibration mode; and amplifying the resultant signal from said previous step; and determine from signals at said virtual node and virtual antinode the phase of the oscillating signal, and updating the predicted phase of the signal based on the determination.

5. The method of claim 4, where the position of the pickoff electrodes are twenty-two and one-half degrees from the actual antinode.

6. The method of claim 4, where the amplification of the resultant signal is at least 5000 times the unamplified signal.

7. The method of claim 4, including a step where the resultant signal and the summed signal are forwarded to a multiplexor.

8. The method of claim 7, including a step where the multiplexor receives both the amplified resultant signal and the unamplified resultant signal.

9. The method of claim 8, where the multiplexor is connected to an analog-to-digital converter and the method includes a step of converting the signals communicated to the multiplexor to a digital signal.

10. The method of claim 4, where the amplification of the signal occurs in at least an eleven bit amplifier.

11. The method of claim 4, further comprising the step of numerically demodulating the amplified signal to distinguish between the first mode of vibration and the second mode of vibration.

12. The method of claim 11 further comprising the step of forcing the oscillating signal to minimize the contribution of the first mode of vibration at the virtual node.

13. An system for minimizing secondary harmonics from a pickoff electrode comprising:

a pair of pickoff electrodes spaced from a sinusoidal signal such that said pickoff electrodes can determine an amplitude from said sinusoidal signal, where said signal includes contributions of a first vibratory mode and at least a second vibratory mode;

a summing element for adding the signals from said first and second electrode and communicating said summed signal to a multiplexor;

a differencing element for differencing the signal from said first and second electrode and communicating said summed signal first to an amplifier, and then to said multiplexor; and a microprocessor for distinguishing between a contribution of said first vibratory mode and a contribution of said second vibratory mode, and evaluating the phase of the sinusoidal signal based on said distinguishing of said microprocessor.

14. The system of claim 13, wherein the contribution of the first vibratory mode at said first pickoff electrode is equal to the contribution of the first vibratory mode at said second pickoff electrode, and the contribution of the second vibratory mode at said first pickoff electrode is equal to the contribution of the second vibratory mode at said second pickoff electrode.

15. The system of claim 14, wherein the pickoff electrodes are equally spaced from an antinode of the sinusoidal signal.

16. The system of claim 15 wherein the pickoff electrodes are spaced twenty-two and one-half degrees from the antinode of the sinusoidal signal.

17. The system of claim 15, wherein said system is incorporated into a vibratory resonating gyroscope.

18. The system of claim 17, wherein said vibratory resonating gyroscope comprises a hemispherical resonating gyroscope.

19. The system of claim 18, wherein the sinusoidal signal is the standing wave generated in the hemispherical resonating gyroscope.

20. The system of claim 19, wherein the hemispherical resonating gyroscope is operating in force-rebalance mode.

* * * * *